Sept. 12, 1972                    I. L. KALNIN                    3,691,000
GLASS FIBER REINFORCED COMPOSITE ARTICLE EXHIBITING
ENHANCED LONGITUDINAL TENSILE AND
COMPRESSIVE MODULI
Filed March 10, 1971

INVENTOR,
ILMAR L. KALNIN

United States Patent Office 3,691,000
Patented Sept. 12, 1972

3,691,000
GLASS FIBER REINFORCED COMPOSITE ARTICLE EXHIBITING ENHANCED LONGITUDINAL TENSILE AND COMPRESSIVE MODULI
Ilmar L. Kalnin, Millington, N.J., assignor to Celanese Corporation, New York, N.Y.
Filed Mar. 10, 1971, Ser. No. 122,842
Int. Cl. B32b 5/12, 27/04
U.S. Cl. 161—60                                  13 Claims

ABSTRACT OF THE DISCLOSURE

Glass fiber reinforced composite articles are produced which possess a surprisingly enhanced longitudinal stiffness. The composite articles comprise a resinous matrix material which has incorporated therein substantially parallel hybrid fibrous reinforcing laminate in an appropriate concentration as described. Laminae of relatively high modulus carbon fiber simultaneously serve as fibrous reinforcement in conjunction with laminae of glass fiber.

---

The resulting composite articles are particularly suitable for use as structural elements in those applications where lightweight, as well as high longitudinal tensile and compressive moduli, are factors of prime importance.

BACKGROUND OF THE INVENTION

Fiber reinforced resinous materials are well known, and in recent years have achieved increasing acceptance as suitable substitutes for more conventional materials, e.g., wood and steel. In many applications, particularly where weight or extraordinary mechanical properties are important consideration, fiber reinforced composite articles are often considered to be superior to conventional materials.

Commonly, the fibrous reinforcement employed in a given composite article is homogeneous, i.e., all of the fibrous reinforcement is provided by a fibrous material of the same composition. For instance, glass fiber reinforced composite articles have achieved the highest commercial utilization of any fiber reinforced composites to date. Such composites offer the user the advantage of low cost and high strength. The stiffness of such fiber reinforced composites, while being adequate for many applications, has tended to be relatively low, however. For instance, commercially available glass fiber commonly exhibits a relatively high mean tensile strength of 250,000 to 450,000 p.s.i. and a relatively low mean Young's modulus of about 10,000,000 to 12,500,000 p.s.i.

In the search for high-performance fiber reinforced composite materials, considerable emphasis has been focused upon fibrous reinforcement of high modulus carbon fibers. Such fibers commonly exhibit a predominant X-ray diffraction pattern characteristic of graphite, are corrosion and high temperature resistant, have a low density, high tensile strength, and high modulus. For instance, graphitic carbon fibers exhibiting a modulus of 60,000,000 to 10,000,000 p.s.i., or more, may be produced by the more advanced techniques. Also, graphite is one of the few known materials whose tensile strength increases with with temperature. Such high modulus carbon fibers have tended to be much more expensive to produce than glass fibers.

In the past attempts have been made at improving the balance of composite mechanical properties through the simultaneous use of diverse fibrous reinforcing media. For instance, relatively short lengths of glass and asbestos fibers may be admixed and incorporated at random in a matrix material. The resulting composites do tend, however, to exhibit a relatively low composite strength and stiffness which are insufficient for many advanced applications.

It is also known in the art to produce fiber reinforced composites wherein diverse types of fibrous reinforcement are provided in a macrocombination rather than in an intimate blend. The term "hybrid" is being increasingly applied to such composites wherein chemicaly diverse fibrous reinforcing media coexisting within a composite are individually provided at definite predetermined regions. It is normally expected from theory that certain hybrid composite properties, such as the longitudinal tensile and compressive moduli, when measured in the fiber direction (i.e. longitudinal direction) will be in accordance with the "rule of mixtures" or "rule of addivity" wherein the ultimate composite properties exhibited can be predicted from the inherent moduli and relative quantities of the diverse reinforcing media.

It is an object of the invention to provide a glass fiber reinforced composite article exhibiting enhanced longitudinal stiffness.

It is an object of the invention to provide hybrid glass fiber and high modulus carbon fiber reinforced composite articles wherein the longitudinal tensile and compressive moduli are synergistically enhanced to a level higher than predicted through the application of the rule of mixtures.

It is an object of the invention to provide glass fiber reinforced composite articles of enhanced longitudinal stiffness which may be economically produced.

It is an object of the invention to provide glass fiber reinforced composite articles wherein the mode of failure is non-catastrophic.

It is another object of the invention to provide improved fiber reinforced composite articles wherein the reinforcement is simultaneously provided by a macrocombination of glass and graphite fibers.

These and other objects as well as the scope, nature and utilization of the composite articles of the present invention will be apparent from the following description and appended claims.

SUMMARY OF THE INVENTION

It has been found that a glass fiber reinforced composite article exhibiting surprisingly enhanced longitudinal tensile and longitudinal compressive moduli comprises a solid resinous matrix material and substantially parallel hybrid fibrous reinforcing laminae embedded therein in a concentration of about 30 to 70 percent by volume based upon the total volume of said composite article with said hybrid fibrous reinforcing laminae comprising:

(a) A plurality of lamina of glass fiber having a mean tensile strength of at least about 250,000 p.s.i. in a concentration of 60 to 90 percent by volume based upon the total volume of said hybrid fibrous reinforcing laminae with at least 30 percent by volume of said glass fiber of said glass lamina being longitudinally disposed within said composite article, and (b) A plurality of lamina of carbon fiber containing at least 95 percent carbon by weight and exhibiting a predominant graphitic X-ray diffraction pattern having a mean Young's modulus of at least about 60,000,000 p.s.i. in a concentration of about 10 to 40 percent by volume based upon the total volume of said hybrid fibrous reinforcing laminae with at least 70 percent by volume of said carbon fiber of said carbon lamina being longitudinally disposed within said composite article.

DESCRIPTION OF THE PREFERRED EMBODIMENTS

Figure 1:
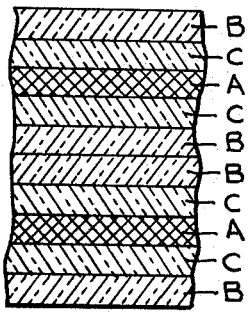
FIG. 1 is an enlarged diagrammatic cross-sectional view of a portion of the composite article of Example I showing the arrangement of the hybrid laminae.

In the glass fiber reinforced composite article of the present invention the matrix portion of the composite structure is a solid resinous material. The solid resinous material may be conveniently selected from those synthetic polymeric materials commonly utilized as the binder or continuous matrix in composite structures formed in accordance with the prior art. The resinous matrix material is provided in concentration of about 30 to 70 percent by volume based upon the total volume of the composite article, and preferably in a concentration of about 30 to 50 percent by volume based upon the total volume of the composite article. The resinous matrix material may be a thermoplastic resin or a substantially cured thermosetting resin. In a preferred embodiment of the composite article, the resinous matrix material is a fully cured thermosetting resin which is capable of withstanding elevated temperatures (e.g., 175° C. or more) without deformation.

Representative thermoplastic resinous materials which may serve as the solid matrix material include: polyamides, polyolefins (e.g. polyethylene), polysulfones, polyphenoxys, polytetrafluoroethylene, etc. The preferred thermoplastic resinous material is a polyamide (e.g. nylon 66 formed by the condensation of hexamethylene diamine with adipic acid).

Representative thermosetting resinous materials which may serve as the solid matrix include: epoxy resins, polyester resins, polyimide resins, polybenzimidazoles, polyurethanes, etc. The preferred thermosetting resinous material is an epoxy resin.

The epoxy resin utilized as the resinous matrix material may be prepared by the condensation of bisphenol A (4,4' isopropylidene diphenol) and epichlorohydrin. Also, other polyols, such as aliphatic glycols and novolak resins (e.g., phenol-formaldehyde resins), acids or other active hydrogen containing compounds may be reacted with epichlorohydrin for the production of epoxy resins suitable for use as the resinous matrix material. Epoxy resins are preferably selected which possess or can be modified to possess the requisite flow characteristics prior to curing. Numerous reactive diluents or modifiers which are capable of increasing the flow properties of uncured epoxy resins are well known and include butyl glycidyl ether, higher molecular weight aliphatic and cycloaliphatic mono-glycidyl ethers, styrene oxide, aliphatic and cycloaliphatic diglycidyl ethers, and mixtures of the above.

In preferred embodiments of the invention, epoxy resins are selected to serve as the resinous matrix material which possess terminal epoxide groups and are the condensation product of bisphenol A and epichlorohydrin of the following formula:

where $n$ varies between zero and a small number less than about 10. When $n$ is zero, the resin prior to curing is a very fluid light-colored material which is essentially the diglycidyl ether of bisphenol A. As the molecular weight increases so generally does the viscosity of the resins. Accordingly, particularly preferred liquid epoxy resins generally possess an $n$ value averaging less than about 1.0. Illustrative examples of standard trade designations of particularly useful commercially available epoxy resins include: Epi-Rez 508, and Epi-Rez 510 (Celanese Coatings), ERLA 2256 (Union Carbide), ERLA 4617 (Union Carbide), and Epon (Shell) epoxy resins.

Epoxy novolak resins formed by the reacting epichlorohydrin with phenol-formaldehyde resins are also particularly preferred thermosetting resins. An illustrative example of a highly useful resin is Epi-Rez 5155 epoxy novolak resin (Celanese Coatings).

A variety of epoxy resin curing agents may be employed in conjunction with the epoxy resin. The curing or hardening of the epoxy resin typically involves further reaction of the epoxy or hydroxyl groups to cause molecular chain growth and cross-linking. The term "curing agent" as used herein is accordingly defined to include the various hardeners of the co-reactant type. Illustrative classes of known epoxy curing agents which may be utilized include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use with the epoxy resin are acid anhydrides (e.g., hexahydrophthalic acid and methylbicyclo[2.2.1] heptene-2,2-dicarboxylic anhydride isomers marketed under the designation Nadic Methyl Anhydride by the Allied Chemical Company), and aromatic amines (e.g., meta-phenylene diamine and dimethylaniline).

The composite article of the present invention is reinforced by the simultaneous presence therein of substantially parallel laminae of glass fiber and of high-modulus carbon fiber as discussed hereafter. Such hybrid fibrous reinforcement is provided in a concentration of about 30 to 70 percent by volume based upon the total volume of the composite article, and preferably in a concentration of about 50 to 70 percent by volume based upon the total volume of the composite article.

The relatively inexpensive laminae of glass fiber are provided as the major proportion by volume of the fibrous reinforcement. More specifically, the laminae of glass fiber are provided in a concentration of 60 to 90 percent by volume based upon the total volume of the hybrid fibrous reinforcing laminae, and preferably in a concentration of 75 to 90 percent by volume based upon the total volume of the hybrid fibrous reinforcing laminae.

The laminae of glass fiber selected for use in the formation of the composite articles are fibrous layers or plies preferably having a thickness of about 2 to 25 mils, and most preferably a thickness of about 5 to 10 mils. Such laminae are preferably at least initially provided in a flat configuration of substantially uniform thickness. The denier of the individual glass fibers present within the same may be varied widely, e.g., about 1.2 to 5, and preferably about 1.6 to 3.4. The preferred fiber diameter of the individual glass fibers accordingly ranges from about 9 to 14 microns.

The glass fiber of the glass laminae is of a relatively high average tensile strength of at least about 250,000 p.s.i., and commonly glass laminae are selected which are formed from glass fiber exhibiting an average tensile strength of about 250,000 to 400,000 p.s.i. The mean glass

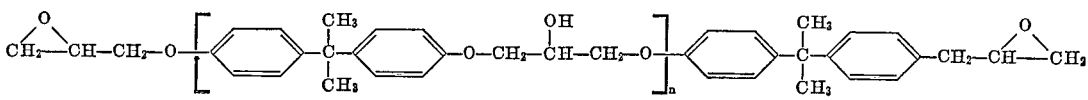

fiber tensile strength of a given glass lamina may be determined by use of ASTM procedure D–2343 "Tensile Properties of Glass Fiber Strands, Yarns and Rovings Used in Reinforced Plastics." Examples of representative commercially available glass fiber meeting the above criteria are "E-glass" having a mean tensile strength of about 250,000–350,000 p.s.i., and "S-glass" having a mean tensile strength of about 350,000–450,000 p.s.i.

The exact arrangement of the glass fiber within a glass lamina can be varied provided at least 30 percent by volume of the glass fiber of the glass lamina is substantially unidirectionally aligned, and the glass lamina is provided within the composite article so that at least 30 percent by volume of the glass fiber of the glass lamina is longitudinally disposed within the composite article (i.e., in the direction wherein maximum stiffness is desired). In a preferred embodiment at least 50 percent by volume of the glass fiber of the glass lamina is substantially aligned in a given direction, and the glass lamina is provided within the composite article so that at least 50 percent by volume of the glass fiber of the glass lamina is longitudinally disposed within the composite article. In a preferred embodiment the laminae of glass are substantially flat layers of unidirectionally aligned glass fiber roving. Alternatively, the glass fiber laminae may consist of a plurality of substantially parallel glass fiber bundles (e.g., a yarn), or a woven cloth or fabric of glass fiber.

Laminae of relatively high modulus carbon fiber are provided in the composite article as a minor proportion by volume of the fibrous reinforcement. More specifically, the laminae of carbon fiber are provided in a concentration of 10 to 40 percent by volume based upon the total volume of the hybrid reinforcing laminae, and preferably in a concentration of 10 to 25 percent by volume based upon the total volume of the hybrid fibrous reinforcing laminae.

The laminae of carbon fiber selected for use in the formation of the composite articles are fibrous layers or plies preferably having a thickness of about 2 to 25 mils, and most preferably a thickness of about 3 to 8 mils. Such laminae are preferably at least initially provided in a flat configuration of substantially uniform thickness. The denier of the individual carbon fibers present within the same may be varied widely, e.g., about 0.4 to 5, and preferably about 0.8 to 1.9. The preferred fiber diameter of the individual carbon fibers accordingly ranges from about 6 to 10 microns.

The laminae of carbon fiber exhibit a predominant graphitic X-ray diffraction pattern and contain at least 95 percent carbon by weight (preferably at least 99 percent carbon by weight). The carbon fiber of the carbon laminae exhibits a relatively high mean Young's modulus of at least about 65,000,000 p.s.i. and commonly carbon laminae are selected which are formed from carbon fiber exhibiting a mean Young's modulus of about 65,000,000 to 100,000,000 p.s.i., or more. The carbon fiber Young's modulus of a given carbon lamina may be determined from the mean Young's modulus of several single filaments, measured, for instance, by the procedure of ASTM designation D–2101–64T.

The high-modulus carbon fibers of the carbon laminae may be formed in accordance with techniques known in the art. For instance, organic polymeric fibrous materials which are capable of undergoing thermal stabilization may be initially stabilized by treatment in an appropriate atmosphere at a moderate temperature (e.g., 200 to 400° C.), and subsequently carbonized and graphitized in a non-oxidizing atmosphere wherein the fibrous material is heated to a maximum temperature of 2000 to 3100° C. (preferably 2400 to 3100° C.).

The exact temperature and atmosphere utilized during the initial stabilization of an organic polymeric fibrous material commonly varies with the composition of the precursor as will be apparent to those skilled in the art. During the carbonization reaction elements present in the fibrous material other than carbon (e.g., oxygen and hydrogen) are substantially expelled. Suitable organic polymeric fibrous materials from which the stabilized fibrous material capable of undergoing carbonization may be derived include an acrylic polymer, a cellulosic polymer, a polyamide, a polybenzimidazole, polyvinyl alcohol, etc. As discussed hereafter, acrylic polymeric materials are particularly suited for use as precursors in the formation of the high modulus carbon fiber. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

A fibrous acrylic polymeric material prior to stabilization may be formed primarily of recurring acrylonitrile units. For instance, the acrylic polymer should contain not less than about 85 mole percent of recurring acrylonitrile units with not more than about 15 mole percent of a monovinyl compound which is copolymerizable with acrylonitrile such as styrene, methyl acrylate, methyl methacrylate, vinyl acetate, vinyl chloride, vinyl pyridine, and the like, or a plurality of such monovinyl compounds.

During the formation of the carbon fiber, multifilament bundles of certain acrylic fibrous materials may be initially stabilized in an oxygen-containing atmosphere (i.e., preoxidized) on a continuous basis in accordance with the teachings of U.S. Ser. No. 749,957, filed Aug. 5, 1968, of Dagobert E. Stuetz, which is assigned to the same assignee as the present invention and is herein incorporated by reference. More specifically, the acrylic fibrous material should be either an acrylonitrile homopolymer or an acrylonitrile copolymer which contains no more than about 5 mole percent of one or more monovinyl comonomers copolymerized with acrylonitrile. In a particularly preferred embodiment the carbon fiber is derived from an acrylonitrile homopolymer. The stabilized acrylic fibrous material which is preoxidized in an oxygen-containing atmosphere is black in appearance, contains a bound oxygen content of at least about 7 percent by weight as determined by the Unterzaucher analysis, retains its original fibrous configuration essentially intact, and is non-burning when subjected to an ordinary match flame.

In preferred techniques for forming the carbon fiber, a stabilized acrylic fibrous material is carbonized and graphitized while passing through a temperature gradient present in a heating zone in accordance with the procedures described in commonly assigned U.S. Ser. Nos. 777,-275, filed Nov. 20, 1968, of Charles M. Clarke; 17,780, filed Mar. 9, 1970, of Charles M. Clarke, Michael J. Ram, and John P. Riggs; and 17,832, filed Mar. 9, 1970, of Charles M. Clarke, Michael J. Ram, and Arnold J. Rosenthal. Each of these disclosures is herein incorporated by reference. The carbon fiber optionally may be surface treated by conventional techniques in order to improve its ability to bond to the resinous matrix material.

The exact arrangement of the high-modulus carbon fiber with a carbon fiber lamina can be varied provided at least 70 percent by volume of the carbon fiber of the lamina is substantially unidirectionally aligned, and the carbon lamina is provided within the composite article so that at least 70 percent by volume of the carbon fiber of the carbon lamina is longitudinally disposed within the composite article (i.e., in the direction wherein maximum stiffness is desired). In a preferred embodiment at least 90 percent by volume of the carbon fiber of the carbon lamina is substantially unidirectionally aligned, and the carbon lamina is provided within the composite article so that at least 90 percent by volume of the carbon fiber of carbon lamina is longitudinally disposed within the composite article. In a preferred embodiment the laminae of high-modulus carbon fiber are substantially flat layers of unidirectionally aligned carbon fiber roving. Alternatively, the carbon fiber laminae may consist of a plurality of substantially parallel carbon fiber bundles (e.g., a yarn), or an unbalanced woven cloth or fabric of carbon fiber.

The composite fabrication technique may be selected from those procedures previously employed in the advanced engineering composite art. In each instance, a composite article is formed containing the parallel glass and high-modulus carbon laminae in the concentrations indicated. Composite articles exhibiting surprisingly high longitudinal tensile and compressive moduli result regardless of the vertical ply arrangement of the parallel laminae within the same. It is preferred, however, that a ply arrangement be selected wherein the composite is balanced with respect to a central plane of symmetry. More specifically, an even number of plies is symmetrically disposed with respect to composition on each side of a central line of symmetry. If the high-modulus carbon laminae are concentrated near each surface of the composite article, then the flexural modulus of the composite article is additionally enhanced as would be predicted. The total number of hybrid reinforcing laminae provided in a composite article in accordance with the present invention may range from as few as about six up to a hundred, or more. Preferred composite articles contain approximately 6 to 12 laminae.

When the matrix material is a thermoplastic resinous material, the composite article may be conveniently formed by impregnating individual lamina with the liquid resinous material, providing a stack of impregnated laminae in an appropriate concentration, and molding the same in accordance with conventional molding techniques. The impregnation of the laminae may be conducted by applying the thermoplastic resinous material to the same from either a solution or from the melt. If desired, pultrusion may be utilized to accomplish the impregnation of an individual lamina or of a previously formed stack of laminae. The molding of the laminae may be conducted by vacuum or pressure molding techniques at an elevated temperature.

When a thermosetting resinous material serves as the matrix material, the individual fibrous lamina may be impregnated with the substantially uncured resin which is provided in liquid form, a plurality of the lamina stacked in an appropriate arrangement, and ultimately molded and cured. For instance, the curing may be conducted while the impregnated laminae are die-molded, vacuum bagged, or autoclaved in accordance with known procedures. When a thermosetting resinous material is selected possessing a relatively quick cure time (e.g., 5 minutes or less), then impregnation, molding, and curing may alternatively be conducted via pultrusion. Composite articles of more complex shapes may be formed by filament or tape winding techniques whereby the hybrid laminae are provided in the resulting composite article in the desired concentration.

The composite articles of the present invention find particular usefulness in those areas where lightweight elements are required which exhibit high longitudinal tensile and compressive moduli. Since a major proportion of the hybrid reinforcing laminae are formed from inexpensive glass fiber, the composites of the invention can be produced on a relatively economical basis. Representative specific use areas for the composite articles include: structural components, stiffeners or supports for a conventional material (e.g., a beam or membrane composed of a metallic or plastic material), skins for low density cores, aircraft fuselage stiffening, boat hull stiffening, lightweight living quarters, cargo containers, bodies for high speed land vehicles (e.g., railroad cars, trucks, autos), structural load supporting house frames, shafts for sporting goods (e.g., golf clubs), high speed rotating engine components (e.g., vanes, blades, rotors).

In addition to exhibiting unexpectedly high longitudinal and compressive moduli the composite articles of the present invention exhibit increased load capacity while operating at a low strain level, non-catastrophic failure characteristics, decreased notch sensitivity, and a lower overall composite density.

The following examples are given as specific illustrations of the invention. It should be understood, however, that the invention is not limited to the specific details set forth in the examples.

In the examples composite articles in accordance with the present invention were formed containing various proportions of laminae of S-glass fiber and high modulus carbon fiber.

The laminae of glass fiber were provided in two different fibrous configurations, i.e. (1) a woven fabric and (2) a flat zero twist roving. The woven glass fabric had a thickness of about 0.006 inch and was commercially available from the Ferro Co. under the designation S-3405 directional fabric. The woven glass fiber fabric had a crow foot satin weave construction and was about 60 percent by volume unidirectionally aligned. The glass fiber roving also had a thickness of about 0.006 inch when laminated and was commercially available from the Ferro Co. under the designation S-1014 roving. The glass fiber roving was substantially 100 percent by volume unidirectionally aligned. The glass fibers of the fabric and roving had a denier of about 1.5. The glass fiber of the fabric and roving had a mean tensile strength in excess of 350,000 p.s.i.

The laminae of high modulus carbon fiber consisted of a plurality adjoining yarn bundles which were provided in parallel contact in the form of a flat ribbon. The fiber of each yarn bundle contained in excess 99 percent carbon by weight, exhibited a predominant graphitic X-ray diffraction pattern, and exhibited a mean Young's modulus of about 70,000,000 p.s.i. The carbon fiber was obtained through the thermal conversion of an acrylonitrile homopolymer fibrous material and was substantially 100 percent by volume unidirectionally aligned. Each yarn bundle of carbon fiber consisted of about 385 continuous filaments having a total denier of about 775 and was provided with a twist of about 0.5 turn per inch. The carbon fiber laminae had a thickness of about .008 inch.

The fibrous material while in the form of a flat ribbon was immersed in a heated liquid epoxy resin-hardener mixture, the excess resin removed by passage through a nip roll, passed through a circulating air oven for about 1.5 minutes provided at 120° C., and the resin impregnated tape wound upon a rotating heated drum provided at 80° C. to produce a directional sheet where it was retained for 15 minutes and the resin was partially cured to a tacky B-stage consistency. The resinous matrix material was provided as a solventless system which contained 100 parts by weight of epoxy resin and 88 parts by weight of anhydride curing agent. The directional sheet was removed from the drum and cut into plies (i.e. laminae) of 3 inches x 9.5 inches having thicknesses substantially identical to the fibrous material prior to impregnation. The fibers of the glass roving and high modulus carbon fiber were disposed lengthwise in the plies, and the glass fabric was cut so that about 60 percent by volume of the fibers present therein were disposed lengthwise in the plies.

The resin impregnated and partially cured plies were laid up consecutively by hand in a 3 inch x 12 inch flat steel die and were molded in a Carver press for 2 to 3 hours at 200° C. and 100 p.s.i. pressure. The cured laminate was removed from the mold after curing, and was cut with a fine diamond wheel in bars for physical testing. The longitudinal compressive modulus of the composites was determined in accordance with the procedure described in detail in Bulletin CAC2A entitled "Compressive Testing for High Modulus Composites," published by Celanese Advanced Engineering Composites (February 1970). The longitudinal tensile modulus of the composites was determined in accordance with the procedure described in detail in Bulletin CAC2B entitled "Tensile Testing for High Modulus Composites," published by Celanese Advanced Engineering Composites (May 1970).

In FIGS. 1 through 4 enlarged diagrammatic cross-sectional views of a portion of the composite articles formed in Examples I, II, III, and IV are presented. In each drawing A designates a high modulus carbon fiber lamina, B designates an S-glass fiber roving lamina, and C designates an S-glass fiber fabric lamina.

EXAMPLE I

Ten ply composite articles were formed consisting of 2 plies of high modulus carbon fiber A, 4 plies of S-glass roving B, and 4 plies of S-glass fabric C in the arrangement illustrated in FIG. 1. The thickness of the composite articles was 0.057 inch and the density of the same was 2.04 grams/cm.$^3$. Chemical analysis indicated the resulting composite articles to be composed of 32 percent by volume epoxy resin, and 68 percent by volume of the hybrid fibrous reinforcing laminae (i.e. 12.5 percent by volume carbon fiber and 55.5 percent by volume S-glass). The high modulus carbon laminae were accordingly present in the composite article in concentration of 18.4 percent by volume based upon the total volume of the hybrid fibrous reinforcing laminae.

The mean longitudinal tensile modulus of the composite articles was found to be $16.0 \times 10^6$ p.s.i. The mean compressive modulus of the composite articles was $12.5 \times 10^6$ p.s.i. The mean tensile fracture stress of the composite articles was 57,300 p.s.i. and the fracture strain 0.36 percent. The mean failure strength in compression of the composite articles was 47,600 p.s.i. occurring at a strain of 0.44 percent.

EXAMPLE II

Figure 2:
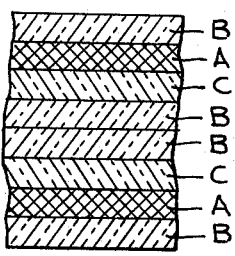
FIG. 2 is an enlarged diagrammatic cross-sectional view of a portion of the composite article of Example II showing the arrangement of the hybrid laminae.

Eight ply composite articles were formed consisting of 2 plies of high modulus carbon fiber A, 3 plies of S-glass roving B, and 3 plies of S-glass fabric C in the arrangement illustrated in FIG. 2. The thickness of the composite articles was 0.044 inch and the density of the same was 2.02 grams/cm.$^3$. Chemical analysis indicated the resulting composite articles to be composed of 30.5 percent by volume epoxy resin, and 69.5 percent by volume of the hybrid fibrous reinforcing laminae (i.e. 16.5 percent by volume carbon fiber and 53 percent by volume S-glass). The high modulus carbon laminae were accordingly present in the composite article in concentration of 23.8 percent by volume based upon the total volume of the hybrid fibrous reinforcing laminae.

The mean longitudinal tensile modulus of the composite articles was found to be $18.7 \times 10^6$ p.s.i. The mean compressive modulus of the composite articles was $14.3 \times 10^6$ p.s.i. The mean tensile fracture stress of the composite articles was 67,400 p.s.i. and the fracture strain 0.35 percent. The mean failure strength in compression of the composite articles was 43,300 p.s.i. occurring at a strain of 0.35 percent.

EXAMPLE III

Figure 3:
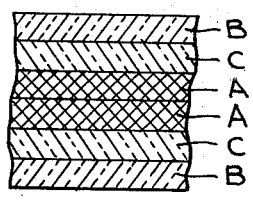
FIG. 3 is an enlarged diagrammatic cross-sectional view of a portion of the composite article of Example III showing the arrangement of the hybrid laminae.

Six ply composite articles were formed consisting of 2 plies of high modulus carbon fiber A, 2 plies of S-glass roving B, and 2 plies of S-glass fabric C in the arrangement illustrated in FIG. 3. The thickness of the composite articles was 0.033 inch and the density of the same was 1.98 grams/cm.$^3$. Chemical analysis indicated the resulting composite articles to be composed of 30 percent by volume epoxy resin, and 70 percent by volume of the hybrid fibrous reinforcing laminae (i.e. 21 percent by volume carbon fiber and 49 percent by volume S-glass). The high modulus carbon laminae were accordingly present in the composite article in concentration of 30 percent by volume based upon the total volume of the hybrid fibrous reinforcing laminae.

The mean longitudinal tensile modulus of the composite articles was found to be $21.2 \times 10^6$ p.s.i. The mean tensile fracture stress of the composite articles was 70,000 p.s.i. and the fracture strain 0.32 percent. Because of the thinness of the composite articles the compressive tests could not be reliably conducted.

EXAMPLE IV

Figure 4:
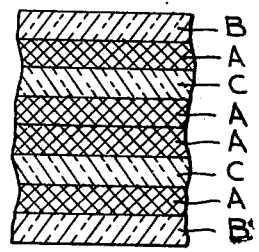
FIG. 4 is an enlarged diagrammatic cross-sectional view of a portion of the composite article of Example IV showing the arrangement of the hybrid laminae.

Eight ply composite articles were formed consisting of 4 plies of high modulus carbon fiber A, 2 plies of S-glass roving B, and 2 plies of S-glass fabric C in the arrangement illustrated in FIG. 4. The thickness of the composite articles was 0.049 inch and the density of the same was 1.87 grams/cm.$^3$. Chemical analysis indicated the resulting composite articles to be composed of 40 percent by volume epoxy resin, and 60 percent by volume of the hybrid fibrous reinforcing laminae (i.e. 23 percent by volume carbon fiber and 37 percent by volume S-glass). The high modulus carbon laminae were accordingly present in the composite article in concentration of 38.3 percent by volume based upon the total volume of the hybrid fibrous reinforcing laminae.

The mean longitudinal tensile modulus of the composite articles was found to be $25.7 \times 10^6$ p.s.i. The mean compressive modulus of the composite articles was $29.0 \times 10^6$ p.s.i. The mean tensile fracture stress of the composite articles was 61,000 p.s.i. and the fracture strain 0.24 percent. The mean failure strength in compression of the composite articles was 45,100 p.s.i. occurring at a strain of 0.22 percent.

For comparative purposes composite articles were formed as heretofore described wherein the fibrous reinforcement consisted solely of laminae of the S-glass fiber, and wherein the fibrous reinforcement consisted solely of the laminae of carbon fiber. The S-glass reinforced composites consisted of alternating plies of the S-glass roving and the S-glass fabric. In each instance, the resulting composite articles consisted of 35 percent by volume epoxy resin and 65 percent by volume fibrous reinforcing laminae. The mean longitudinal tensile modulus for the S-glass reinforced composites was $8 \times 10^6$ p.s.i. The mean longitudinal tensile modulus for the carbon fiber reinforced composites was $40 \times 10^6$ p.s.i. The mean compressive modulus for the S-glass reinforced composites was $7 \times 10^6$ p.s.i. The mean compressive modulus for the carbon fiber reinforced composites was $33 \times 10^6$ p.s.i.

Figure 5:
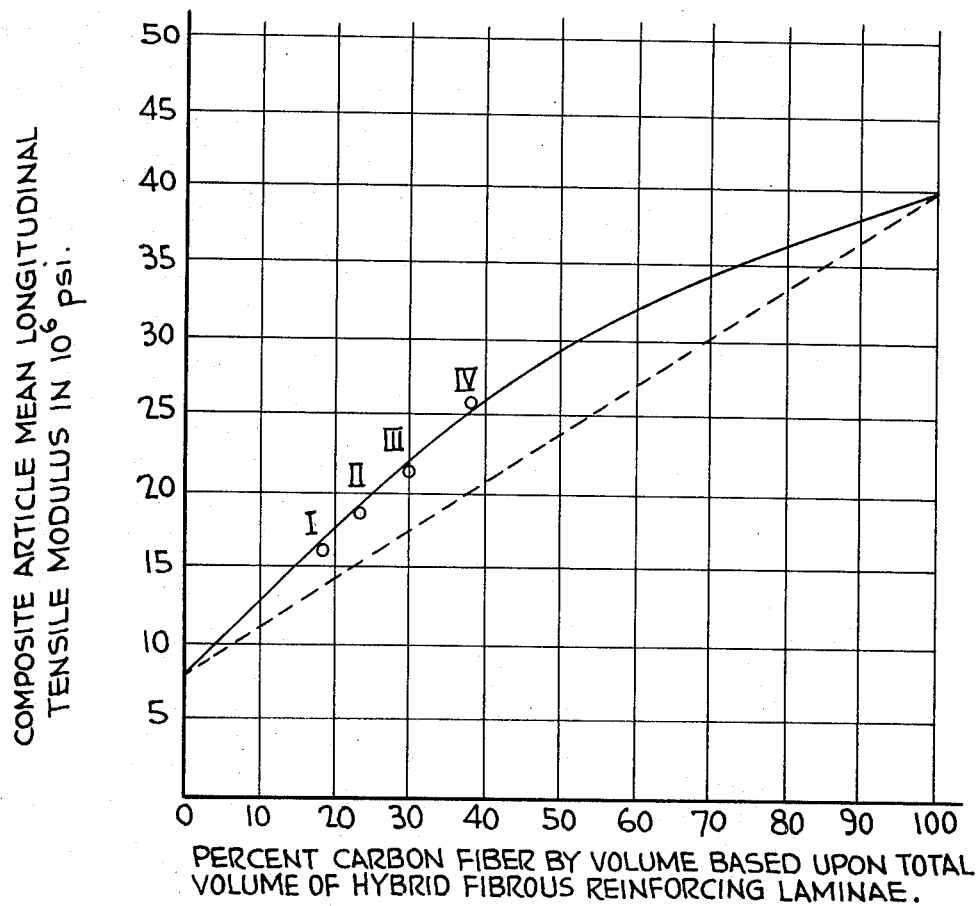
FIG. 5 is a graphic presentation of the theoretically predicted composite longitudinal tensile modulus (dash line) as a function of the volume of high modulus carbon fiber reinforcing laminae present within the same. The longitudinal tensile modulus actually exhibited is also shown (solid line) with the numbered points along the line corresponding to the example numbers.

FIG. 5 is a graphic presentation of the theoretically predicted composite longitudinal tensile modulus (dash line) as a function of the volume of high modulus carbon reinforcing laminae present within the same. The mean values obtained for the above comparative composite articles as well as for the composites of Examples I-IV (solid line) are plotted on FIG. 5. The numbered points along the solid line correspond to the example numbers.

It will be noted with respect to Example I that the theoretically predicted longitudinal tensile modulus is about $13.6 \times 10^6$ p.s.i., while the composite article formed in accordance with the present invention exhibited a surprisingly enhanced value of $16.0 \times 10^6$ p.s.i.

It will be noted with respect to Example II that the theoretically predicted longitudinal tensile modulus is about $15.3 \times 10^6$ p.s.i., while the composite article formed in accordance with the present invention exhibited a surprisingly enhanced value of $18.7 \times 10^6$ p.s.i.

It will be noted with respect to Example III that the theoretically predicted longitudinal tensile modulus is about $17.3 \times 10^6$ p.s.i., while the composite article formed in accordance with the present invention exhibited a surprisingly enhanced value of $21.2 \times 10^6$ p.s.i.

It will be noted with respect to Example IV that the theoretically predicted longitudinal tensile modulus is about $20.0 \times 10^6$ p.s.i., while the composite article formed in accordance with the present invention exhibited a surprisingly enhanced value of $25.7 \times 10^6$ p.s.i.

While not graphically presented, it will be apparent to those skilled in the art that compressive modulus values of composite articles formed in accordance with the present invention are also surprisingly enhanced.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A glass fiber reinforced composite article exhibiting enhanced longitudinal tensile and longitudinal compressive moduli comprising a solid resinous matrix material in a concentration of about 30 to 70 percent by volume based upon the total volume of the composite article and substantially parallel hybrid fibrous reinforcing laminae embedded therein in a concentration of about 30 to 70 percent by volume based upon the total volume of said composite article with said hybrid fibrous reinforcing laminae comprising:
   (a) a plurality of lamina of glass fiber having a mean tensile strength of at least about 250,000 p.s.i. in a concentration of 60 to 90 percent by volume based upon the total volume of said hybrid fibrous reinforcing laminae with at least 30 percent by volume of said glass fiber of said glass lamina being longitudinally disposed within said composite article, and
   (b) a plurality of lamina of carbon fiber containing at least 90 percent carbon by weight and exhibiting a predominant graphitic X-ray diffraction pattern having a mean Young's modulus of at least about 60,000,000 p.s.i. in a concentration of about 10 to 40 percent by volume based upon the total volume of said hybrid fibrous reinforcing laminae with at least 70 percent by volume of said carbon fiber of said carbon lamina being longitudinally disposed within said composite article.

2. A glass fiber reinforced composite article in accordance with claim 1 wherein said solid resinous matrix material is present in a concentration of 30 to 50 percent by volume based upon the total volume of said composite article and said hybrid fibrous reinforcing laminae are embedded in said solid resinous matrix material in a concentration of about 50 to 70 percent by volume based upon the total volume of said composite article.

3. A glass fiber reinforced composite article in accordance with claim 1 wherein said hybrid fibrous reinforcing laminae comprise said laminae of glass fiber in a concentration of 75 to 90 percent by volume based upon the total volume of said fibrous reinforcing laminae, and said laminae of carbon fiber in a concentration of about 10 to 25 percent by volume based upon the total volume of said hybrid fibrous reinforcing laminae.

4. A glass fiber reinforced composite article in accordance with claim 1 wherein said plurality of lamina of glass fiber are present within said resinous matrix material with at least 50 percent by volume of said glass fiber of said glass lamina being longitudinally disposed within said composite article.

5. A glass fiber reinforced composite article in accordance with claim 1 wherein said plurality of lamina of carbon fiber are present within said resinous matrix material with at least 90 percent by volume of said carbon fiber of said carbon lamina being longitudinally disposed within said composite article.

6. A glass fiber reinforced composite article in accordance with claim 1 wherein said solid resinous matrix material is a thermoplastic resin.

7. A glass fiber reinforced composite article in accordance with claim 1 wherein said solid resinous matrix material is a substantially cured thermosetting resin.

8. A glass fiber reinforced composite article in accordance with claim 1 wherein said lamina of glass fiber and said lamina of carbon fiber each have a thickness of about 2 to 25 mils.

9. A glass fiber reinforced composite article in accordance with claim 1 wherein said lamina of glass fiber and said lamina of carbon fiber are symmetrically balanced within said resinous matrix material.

10. A glass fiber reinforced composite article exhibiting enhanced longitudinal tensile and longitudinal compressive moduli comprising a substantially cured thermosetting resin matrix material in a concentration of about 30 to 50 percent by volume based upon the total volume of the composite article and substantially parallel hybrid fibrous reinforcing laminae embedded therein in a concentration of about 50 to 70 percent by volume based upon the total volume of said composite article with said hybrid fibrous reinforcing laminae comprising:
   (a) a plurality of lamina of glass fiber having a tensile strength of at least about 250,000 p.s.i. in a concentration of 75 to 90 percent by volume based upon the total volume of said hybrid fibrous reinforcing laminae with at least 50 percent by volume of said glass fiber of said glass lamina being longitudinally disposed within said composite article, and
   (b) a plurality of lamina of carbon fiber containing at least about 99 percent carbon by weight and exhibiting a predominant graphitic X-ray diffraction pattern having a Young's modulus of at least about 60,000,000 p.s.i. in a concentration of about 10 to 25 percent by volume based upon the total volume of said hybrid fibrous reinforcing laminae with at least 90 percent by volume of said carbon fiber of said carbon lamina being longitudinally disposed within said composite article.

11. A process according to claim 10 wherein said substantially cured thermosetting resin is an epoxy resin.

12. A glass fiber reinforced composite article in accordance with claim 10 wherein said lamina of glass fiber and said lamina of carbon fiber each have a thickness of about 2 to 25 mils.

13. A glass fiber reinforced composite article in accordance with claim 10 wherein said lamina of glass fiber and said lamina of carbon fiber are symmetrically balanced within said substantially cured thermosetting resin matrix.

References Cited

UNITED STATES PATENTS

| | | | |
|---|---|---|---|
| 3,203,849 | 8/1965 | Katz et al. | 161—96 |
| 3,301,742 | 1/1967 | Noland et al. | 161—170 |

WILLIAM A. POWELL, Primary Examiner

U.S. Cl. X.R.

161—93, 143, 170